United States Patent
Chliwnyj et al.

(10) Patent No.: US 6,661,600 B1
(45) Date of Patent: Dec. 9, 2003

(54) CALIBRATION OF SERVO INDEX POSITIONS OF A MAGNETIC TAPE EMPLOYING SECOND ORDER CURVE FITTING

(75) Inventors: Alex Chliwnyj, Tucson, AZ (US); Ernest Stewart Gale, Tucson, AZ (US); John James Gniewek, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 09/703,905

(22) Filed: Nov. 2, 2000

(51) Int. Cl.[7] ............................................... G11B 5/584
(52) U.S. Cl. .................................................... 360/77.12
(58) Field of Search ............................... 360/77.12, 53, 360/76

(56) References Cited

U.S. PATENT DOCUMENTS

| | | | |
|---|---|---|---|
| 5,121,270 A | 6/1992 | Alcudia et al. | 360/77.01 |
| 5,426,543 A | 6/1995 | Dy et al. | 360/77.12 |
| 5,448,430 A | 9/1995 | Bailey et al. | 360/77.12 |
| 5,574,602 A | 11/1996 | Baca et al. | 360/77.12 |
| 5,629,813 A | 5/1997 | Baca et al. | 360/77.12 |
| 5,675,448 A | 10/1997 | Molstad et al. | 360/77.12 |
| 5,847,892 A | 12/1998 | Goker | 360/76 |
| 5,872,672 A | 2/1999 | Chliwnyj et al. | 360/77.12 |
| 5,946,159 A | 8/1999 | Chliwnyj et al. | 360/77.12 |
| 5,949,607 A * | 9/1999 | Kalfs et al. | 360/77.12 |
| 6,031,673 A | 2/2000 | Fasen et al. | 360/53 |

* cited by examiner

Primary Examiner—David Hudspeth
Assistant Examiner—Mitchell Slavitt
(74) Attorney, Agent, or Firm—John H. Holcombe

(57) ABSTRACT

A servo system and method for calibrating servo index positions of a magnetic tape for track following linear servo edges, each servo edge comprising an interface between dissimilar recorded servo signals, the edges on opposite lateral sides of a middle servo signal. A servo loop laterally positions a servo sensor where the servo signals are at estimated ratios representing the locations of the servo edges. An independent position sensor indicates the mechanical lateral position of the servo sensor at the sensed servo edges. The servo loop repositions the servo sensor to a plurality of lateral positions at predetermined displacements from the independent position sensor sensed servo edges, and track follows at each of the predetermined offsets. The ratio of the sensed servo signals is determined for each predetermined displacement, and a two dimensional, second order curve is fitted to the ratios with respect to the predetermined displacements to calibrate expected position error signals at the offset servo index positions.

14 Claims, 9 Drawing Sheets

CALIBRATION OF SERVO INDEX POSITIONS OF A MAGNETIC TAPE EMPLOYING SECOND ORDER CURVE FITTING

Commonly assigned U.S. Pat. No. 5,946,159 is incorporated for its showing of a track following servo system for following servo track edges of dissimilar servo signals, and employing a non-servo position sensor. Commonly assigned U.S. patent application Ser. No. 09/413,327, filed Oct. 7, 1999 is incorporated for its showing of a servo position detector and a method for detecting and track following an index servo position displaced with respect to an edge of a servo track.

FIELD OF THE INVENTION

This invention relates to servo track following of servo edges of dissimilar servo signals, and, more particularly, to calibrating indexed servo positions displaced with respect to the servo edges, where the sensed dissimilar servo signals may differ in amplitude from nominal.

BACKGROUND OF THE INVENTION

Magnetic tape data storage typically provides prerecorded servo tracks to allow precise positioning of a tape head which has servo sensors, with respect to the prerecorded servo tracks. The tape head comprises one or more read/write elements precisely positioned with respect to the servo sensors and which trace data tracks parallel to the servo tracks. One example of a magnetic tape system is the IBM 3590, which employs magnetic tape having prerecorded servo patterns that include three parallel sets of servo edges, each servo edge being an interface between two dissimilar recorded servo signals, each set of servo edges comprising one servo edge on each of opposite lateral sides of a middle recorded servo signal.

The tape head has several spaced apart servo sensors for each servo edge, with the result that the tape head may be stepped between the servo sensors, each positioning the read write elements at different interleaved groups of data tracks.

Typically, for a given servo pattern of a set of two servo edges, the outer servo signals are recorded first, and the center servo signal is recorded last, to provide the servo edges. As pointed out by the incorporated '159 patent, the nominal separation distance between the servo edges of each set of servo edges is a certain distance, such as 80 microns, but there is variation in the magnetic separation between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation distance of the prerecorded servo tracks from nominal, the prerecording of the servo tracks is conducted at different amplitudes so as to attempt to compensate for the physical difference and provide a magnetic pattern that is closer to nominal. Additionally, three servo sensors are employed to simultaneously sense the three servo tracks, and, the average of the servo signals may be employed to track follow the servo tracks. Thus, the difference in physical distance and in amplitude compensation may tend to offset as between the servo tracks. These actions may provide an adequate signal for track following at the servo edges.

However, to increase track density, the servo sensors may themselves be indexed to positions laterally offset from the linear servo edges to provide further interleaved groups of data tracks. The indexed positions are determined by measuring the ratio between the amplitudes of the two dissimilar recorded servo signals. Thus, when the amplitudes of the recorded servo signals are varied to compensate for physical distance variations, track following the prerecorded servo edges at the offset indexed positions becomes less precise. As the result, the data tracks may vary from the desired positions, for example, squeezed together, such that writing on one track with a write element that is subject to track misregistration (TMR) may cause a data error on the immediately adjacent data track.

SUMMARY OF THE INVENTION

It is an object of the present invention to calibrate the servo index positions which are laterally offset from the servo edges comprising interfaces between two dissimilar recorded servo signals.

Disclosed are a servo system and method for calibrating servo index positions of a magnetic tape for track following, where the magnetic tape has a plurality of parallel sets of linear servo edges, each servo edge comprising an interface between two dissimilar recorded servo signals, each set of servo edges comprising one of the servo edges on each of opposite lateral sides of a middle recorded servo signal. At least some of the servo index positions are laterally offset from the servo edges.

The servo system has at least one servo sensor of a tape head, where the tape head is movable laterally of the magnetic tapes the servo sensor sensing the servo signals comprising the servo edges of at least one set of linear servo edges. An independent position sensor determines the mechanical lateral position of the tape head servo sensor with respect to a tape deck supporting the magnetic tape, and therefore the magnetic tape. A servo detector is coupled to the servo sensor for determining a ratio of the servo signals sensed by the servo sensor, and a servo loop is coupled to the servo detector for positioning the tape head laterally of the magnetic tape to track follow the sensed servo signals at specific position error signals representing offset displacements from the linear servo edges in accordance with the ratios of the sensed servo signals as determined by the servo detector.

Logic is coupled to the servo detector, the independent position sensor, and the servo loop. In accordance with the present invention, the logic operates the servo loop to laterally position the servo sensor to sense the servo signals at estimated ratios of the servo detector representing locations comprising the servo edges of at least a set of linear servo edges. Employing the independent position sensor, the logic determines the lateral position of the tape head servo sensor with respect to the magnetic tape at the sensed servo edges. The logic operates the servo loop to laterally reposition the tape head servo sensor to a plurality of lateral positions of the tape head at predetermined displacements from the sensed servo edges as determined by the independent position sensor, and to track follow the linear servo edges with the servo loop at each of the predetermined displacements. The logic determines, from the servo detector, the ratio of the sensed servo signals at each of the predetermined displacements, and curve fits a two dimensional, second order curve to the ratios of the sensed servo signals with respect to the predetermined displacements for each linear servo edge to calibrate expected position error signals for the servo loop at the laterally offset servo index positions with respect to the sensed servo edges of the set of linear servo edges.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
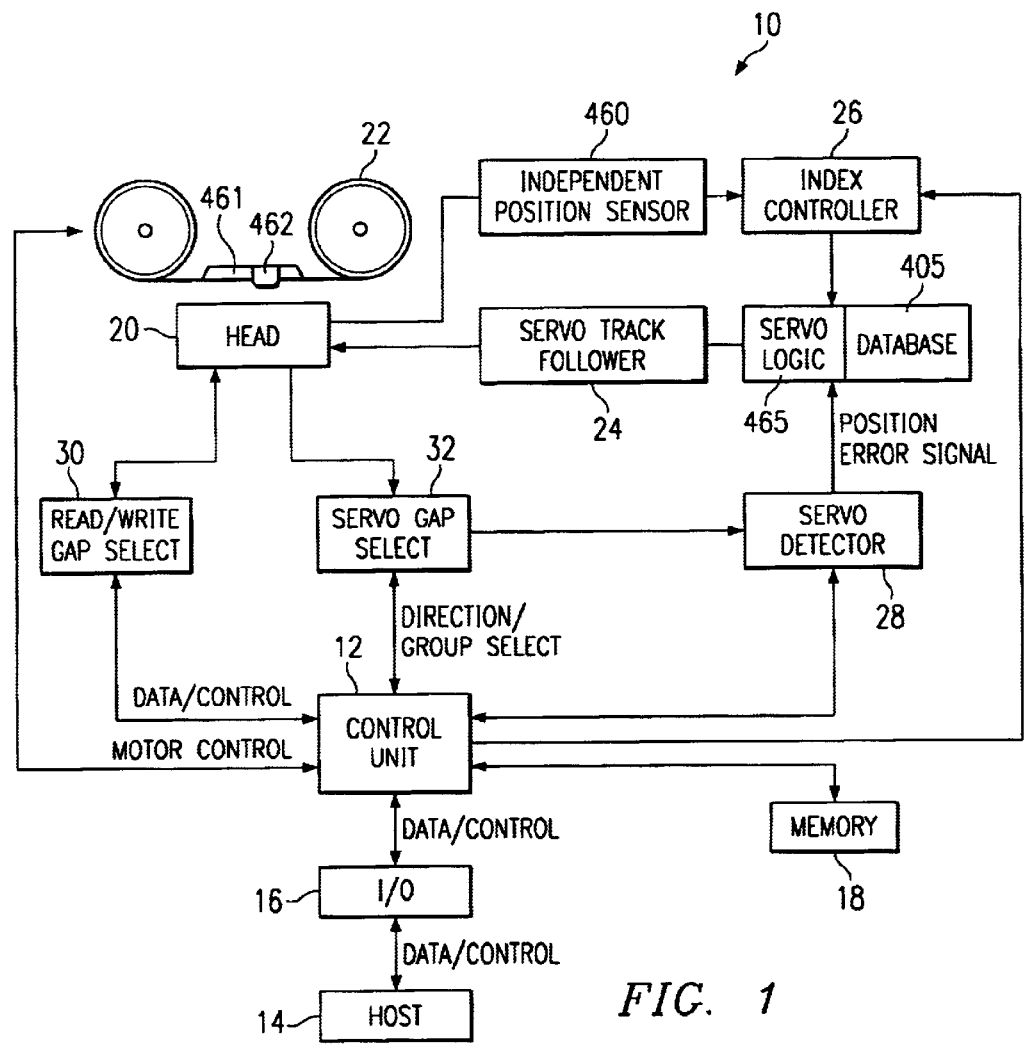
FIG. 1 is a block diagram of an embodiment of a magnetic tape system employing the present invention for calibration of servo index positions.

Referring to FIG. 1, a magnetic tape data storage system 10 is illustrated. One example of a magnetic tape data storage system in which the calibration system of the present invention may be employed is the IBM 3590 magnetic tape subsystem. A control unit 12 is provided which receives and transmits data and control signals to and from a host device 14 via an interface 16. The control unit 12 is coupled to a memory device 18, such as a random access memory for storing information and computer programs. An example of a host device 14 comprises an IBM RS/6000 processor.

A multi-element tape head 20, such as is well known in the art, includes a plurality of data read/write elements to record and read data onto and from a magnetic tape 22, and servo sensors or read elements to read servo signals comprising prerecorded linear servo edges on the magnetic tape 22.

A tape reel motor system (not shown) of the tape data storage system moves the tape 22 in the longitudinal direction while it is supported by a tape deck 461, and held in position laterally at the tape deck 461, for example, by tape guide 462, and a servo track follower 24 directs the motion of the magnetic tape head 20 in a lateral or transverse direction relative to the longitudinal direction of tape motion. The control unit 12 is coupled to the tape reel motors and controls the direction, velocity and acceleration of the tape 22 in the longitudinal direction.

The data tracks on the tape 22 are arranged in parallel and are parallel to the linear servo edges. Thus, as the servo track follower 24 causes the servo sensors of the magnetic tape head to track follow a linear servo edge or a servo index position laterally offset from a servo edge, the data read/write elements track a parallel group of the data tracks. If it is desired to track another parallel group of data tracks, the magnetic tape head 20 is indexed laterally to another servo edge or to another servo index position, or a different servo sensor is aligned with the same or a different servo edge or servo index position.

When the magnetic tape head 20 is to be moved to a selected index position, an index controller 26 is enabled by the control unit 12, receiving a mechanical lateral position signal from an independent position sensor 460 and transmits an appropriate signal to servo logic 465 to select the appropriate servo track, while the control unit 12 transmits an appropriate signal to a servo gap selector 32 to select the appropriate servo sensor. The independent position sensor 460 is discussed in the incorporated U.S. Pat. No. 5,946,159, where it is called a non-servo position sensor, and indicates the lateral mechanical position of the tape head 20 with respect to the tape deck 461 and therefore the magnetic tape 22. The logic 465 operates the servo track follower 24 in accordance with the present invention to calibrate the servo index positions as sensed by the servo sensor with respect to the parallel sets of linear servo edges, as will be explained. The logic 465 may comprise a programmed PROM, ASIC or microprocessor. The tape system 10 may be bidirectional, in which ones of the read/write elements are selected for one direction of movement, and others of the read/write elements are selected for the opposite direction of movement. The control unit 12 additionally selects the appropriate ones of the read/write elements by transmitting a signal to a read/write gap select unit 30. In accordance with the present invention, servo logic 465 employs the servo information sensed by the servo detector 28 and the mechanical positioning information from the independent position sensor 460 to calibrate the track following servo. The track following servo logic is also implemented in the servo logic 465, and may comprise the servo logic of the incorporated U.S. patent application Ser. No. 09/413,327, employing the sensed servo signals to determine the ratios of the sensed servo signals, which are employed in accordance with the present invention to calibrate the servo index positions of the track following servo 24.

Figure 2:
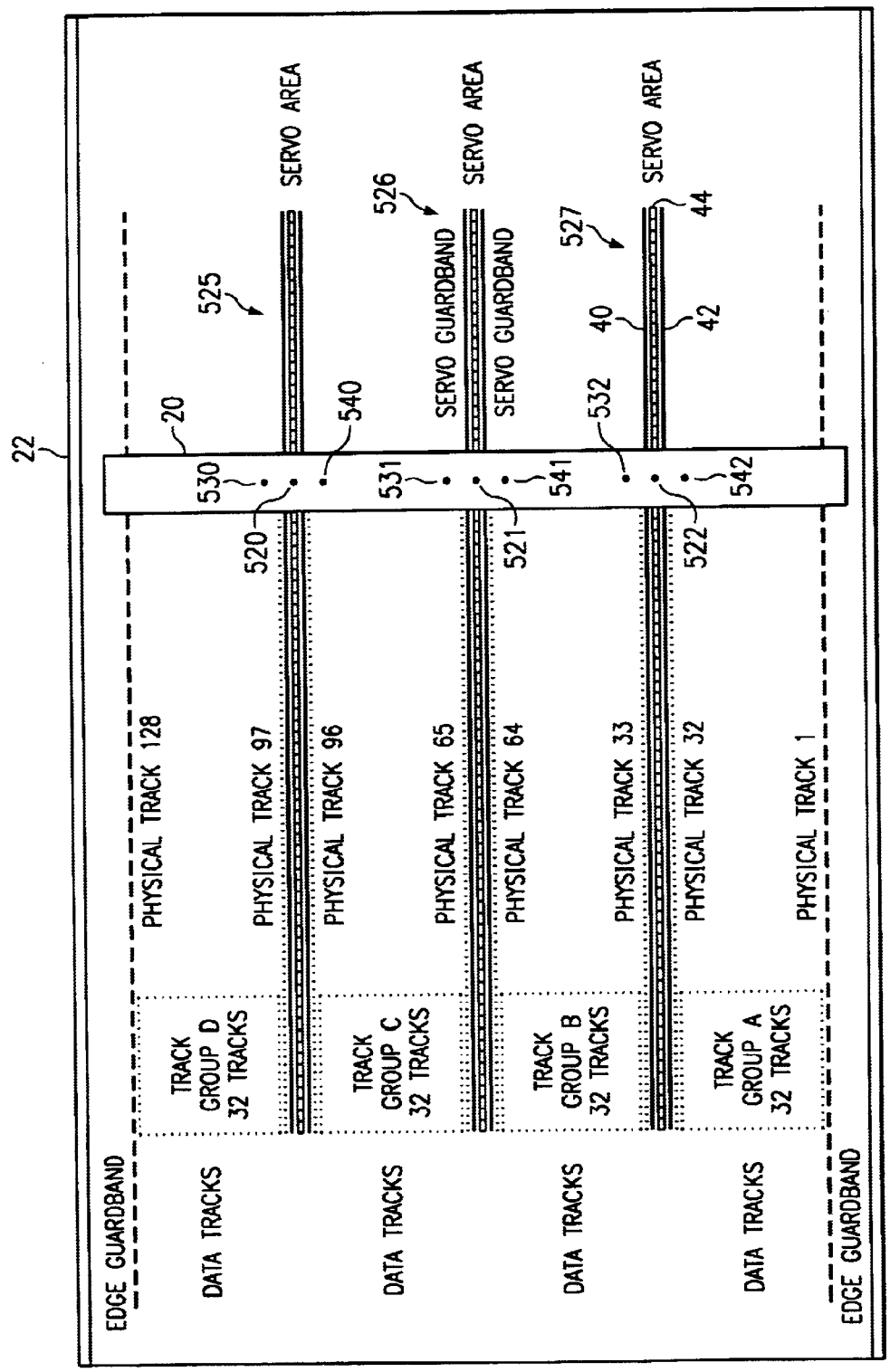
FIG. 2 is a diagrammatic illustration of a magnetic tape having three parallel sets of linear servo edges, each servo edge comprising an interface between two dissimilar recorded servo signals.

Referring to FIG. 2, a plurality, for example, three, parallel sets of linear servo edges 525, 526 and 527 are illustrated, each servo edge comprising an interface between two dissimilar recorded servo signals, each set of servo edges comprising one of the servo edges on each of opposite lateral sides of a middle recorded servo signal. As an example, a corresponding plurality of laterally offset servo sensors 520–522 are spaced apart in the tape head to sense the servo signals at each corresponding edge. Additional pluralities of servo sensors 530–532 and 540–542 may be provided to allow positioning of the tape head at additional data tracks.

Figure 3:
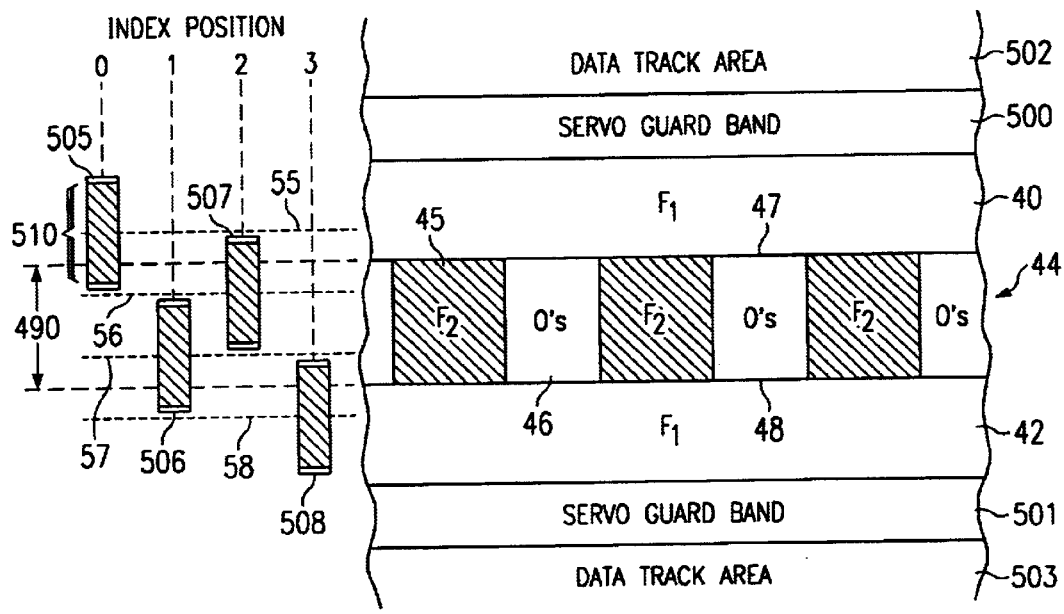
FIG. 3 is a detailed diagrammatic representation of a magnetic tape format providing four servo index positions in one set of two linear servo edges of the magnetic tape of FIG. 2.

Referring to FIG. 3, the typical magnetic tape format of servo signals to form linear servo edges 47 and 48 comprising an interface between two dissimilar recorded servo signals is illustrated. One set of servo edges comprises outer bands 40 and 42, having a recorded pattern of a constant amplitude signal of a single first frequency, on either side of an inner band 44 of the other servo signal, having a recorded pattern alternating between a constant amplitude burst signal 45 of a single second frequency and a zero amplitude null signal 46.

Typically, the servo signals 40–44 are provided with servo guard bands 500 and 501 to protect the outer bands 40 and 42 from noise resulting from the data track areas 502 and 503.

It is desirable that the servo edges are separated by a predetermined nominal distance 490 employed for prerecording the servo signals. Typically, the outer servo signals 40, 42 are recorded first, and the center servo signal 44 is recorded last, to provide the servo edges 47, 48. There is, typically, variation in the magnetic separation 490 between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation distance of the prerecorded servo tracks from nominal, the prerecording of the servo signals is conducted at different amplitudes so as to attempt to compensate for the physical difference and provide a magnetic pattern that is closer to nominal. Additionally, three servo sensors are employed to simultaneously sense the three servo tracks simultaneously, and, the average of the servo signals may be employed to track follow the servo tracks. Thus, the difference in physical distance and in amplitude compensation may tend to offset as between the servo tracks. These actions may provide an adequate signal for track following at the servo edges.

However, to increase data track density, servo index positions 55, 56, 57 and 58 are provided which are laterally offset with respect to the sensed servo edges of the set of linear servo edges. As an example, the servo index positions may be offset laterally about one quarter the width of the inner band 44 away from the servo edge in either direction, providing four index positions. Servo sensors 505, 506, 507 and 508 are provided and are substantially the same sensing width 510 as the predetermined distance 490. The indexed positions are determined by measuring the ratio between the amplitudes of the two dissimilar recorded servo signals, e.g., as measured by the servo detector 28 of FIG. 1, and called the "position error signal", or "PES". The servo logic 465 operates the servo track follower 24 to track follow at the desired measured ratio. For example, the measured ratio will be the ratio between the sum of the sensed outer band signal 40 plus the inner band signal 45, and the sensed outer band signal 40, giving effect to the null 46. The illustrations and descriptions herein employ this ratio. Alternatively, the measured ratio may be the ratio between the outer band signal 40 at frequency $F_1$, and the inner band signal 45 at frequency $F_2$. In order to center the data read/write elements at each of the servo index positions, the ratios must be measured precisely. Thus, when the amplitudes of the recorded servo signals are varied to compensate for physical distance variations, the measured ratios are distorted and track following the prerecorded servo edges at the offset indexed positions becomes less precise. As the result, the data tracks may vary from the desired positions, for example, squeezed together, such that writing on one track with a write element that is subject to track misregistration (TMR) may cause a data error on the immediately adjacent data track.

Figure 4:
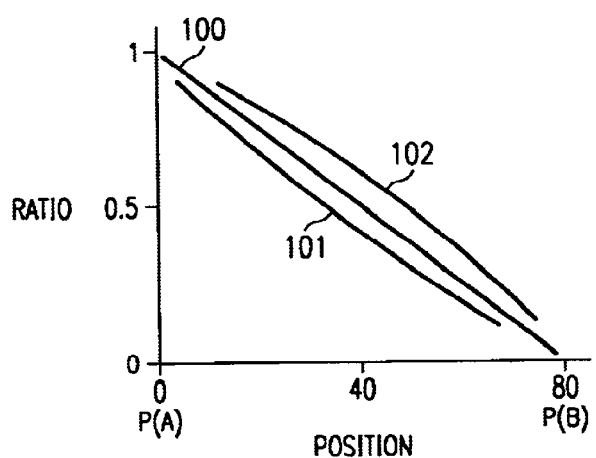
FIG. 4 is a diagrammatic representation of three examples of the ratios between the sensed servo signals of a servo edge of FIG. 3 at various lateral positions, where the recorded servo signals generating the edge are of three different amplitudes.

FIG. 4 illustrates examples of distortion of the measured ratios between the sensed servo signals of one linear servo edge, at various lateral positions of the servo sensors. Referring additionally to FIG. 3, line 100 represents an ideal slope of the measured ratios from a ratio of "1", at which the servo sensor is at position "$P_{(A)}$", which is centered on and senses only the outer band 40 or outer band 42, to a ratio of "0" at which the servo sensor is at position "$P_{(B)}$", which is centered on and senses only the inner band 44. Line 101 represents the varying slope of the ratios where the center recorded servo signal 44 generating the edges is of a relatively strong amplitude. Line 102 represents the varying slope of the ratios where the center recorded servo signal 44 generating the edges is of a relatively weak amplitude. Employing the same ratio setting to position the tape head at various servo index positions for each of the linear edges 100–102 may result in track misregistration.

Figure 5:
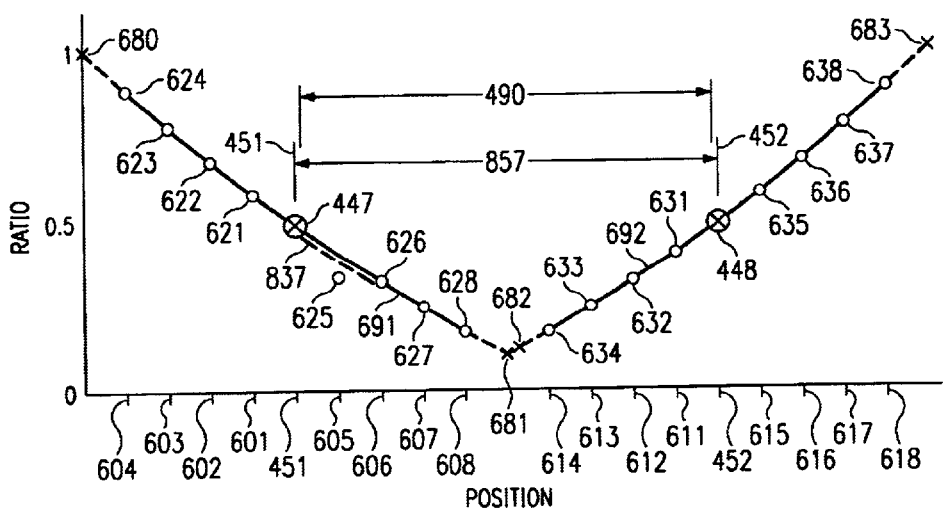
FIG. 5 is a diagrammatic representation of the curve fitting of the ratios between the sensed servo signals of each of two parallel linear edges at various lateral positions in accordance with an embodiment of the present invention, where the center recorded servo signal generating the edges is of a relatively strong amplitude.
Figure 6:
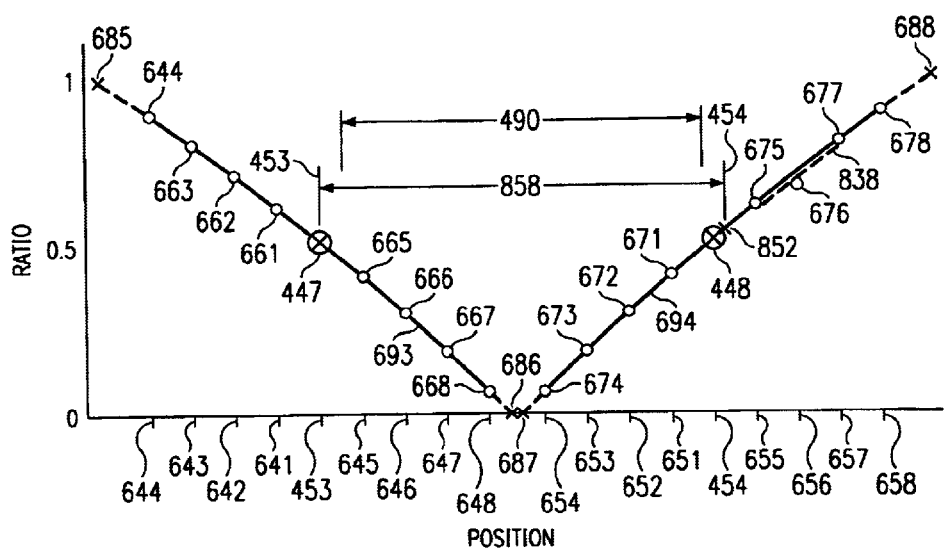
FIG. 6 is a diagrammatic representation of the curve fitting of the ratios between the sensed servo signals of each of two parallel linear edges at various lateral positions in accordance with an embodiment of the present invention, where the center recorded servo signal generating the edges is of a relatively weak amplitude.

FIGS. 5 and 6 represent the ratio between the sensed servo signals of each of two parallel linear servo edges of a set of servo edges, at various lateral positions of the servo sensors. In FIG. 5, the center recorded servo signal generating the edges is of a relatively strong amplitude, and in FIG. 6, the center recorded servo signal generating the edges is of a relatively weak amplitude.

Referring to FIGS. 1, 2, 3, 5 and 6, in accordance with an embodiment of the present invention, servo logic 465 is provided with a database 405 and is coupled to the servo detector 28, the servo track follower 24, and the independent position sensor 460. The logic 465 operates the servo loop, comprising servo gap selector 32, servo detector 28 and servo track follower 24, to later ally position at least one servo sensor, e.g., servo sensor 520, to sense the servo signals, e.g., servo signals 525, at estimated ratios 447 and 448 of the servo detector representing locations 47 and 48 comprising the servo edges of at least a set of linear servo edges. Employing the independent position sensor 460, the logic 465 determines the lateral position 451, 452, 453, 454 of the tape head servo sensor with respect to the magnetic tape at the sensed servo edges. The logic 465 operates the servo loop 32, 28, 24 to laterally reposition the tape head servo sensor to a plurality of lateral positions of the tape head at predetermined displacements from the sensed servo edges as determined by the independent position sensor 460, and to track follow the linear servo edges with the servo loop at each of the predetermined displacements. The predetermined displacements are shown as displacements 601–608 for position 451 of edge 447 and displacements 611–618 for position 452 of edge 448 of FIG. 5, and as displacements 641–648 for position 453 of edge 447 and displacements 651–658 for position 454 of edge 448 of FIG. 6. The logic determines, from the servo detector 28, the ratio of the sensed servo signals at each of the predetermined displacements, shown respectively as points 621–628 for edge 447 and points 631–638 for edge 448 of FIG. 5, and as points 661–668 for edge 447 and points 671–678 for edge 448 of FIG. 6.

The logic 465 curve fits a two dimensional, second order curve to the ratios of the sensed servo signals with respect to the predetermined displacements for each linear servo edge, shown as curve 681 for edge 447, and curve 682 for edge 448 of FIG. 5, and as curve 683 for edge 447, and curve 684 for edge 448 of FIG. 6, making adjustments to the curves as will be explained. Then, the logic 465 employs the fitted curves to calibrate expected position error signals for the servo loop at the laterally offset servo index positions with respect to the sensed servo edges of the set of linear servo edges, also as will be explained.

Referring to FIG. 2, three of the servo sensors, e.g., servo sensors 520–522 sense the edges of the sets of servo edges 525–527 simultaneously, and the ratios of the predetermined displacements measured simultaneously, so that the average of the ratios from the sets of servo edges is employed for curve fitting. The calibration of the expected position error signals is made based on the fitted curve. Alternatively, each set of servo edges 525–527 is measured separately with the corresponding servo sensor, and the curve fitted to each individual edge.

Additionally, the same measurements and calibrations are conducted for other sets of servo sensors 530–532, and of servo sensors 540–542 with respect to the sets of servo edges 525–527. Thus, upon completion of the curve fitting, fitted curves are stored in database 405 of FIG. 1 for the average of servo sensors 520–522, for the average of servo sensors 530–532, and for the average of servo sensors 540–542, each with respect to the sets of servo edges 525–527. Alternatively, upon completion of the curve fitting, fitted curves are stored in database 405 of FIG. 1 for each of the servo sensors 520–522, for each of the servo sensors 530–532, and for each of the servo sensors 540–542, each with respect to the corresponding set of servo edges 525–527.

Figure 7:
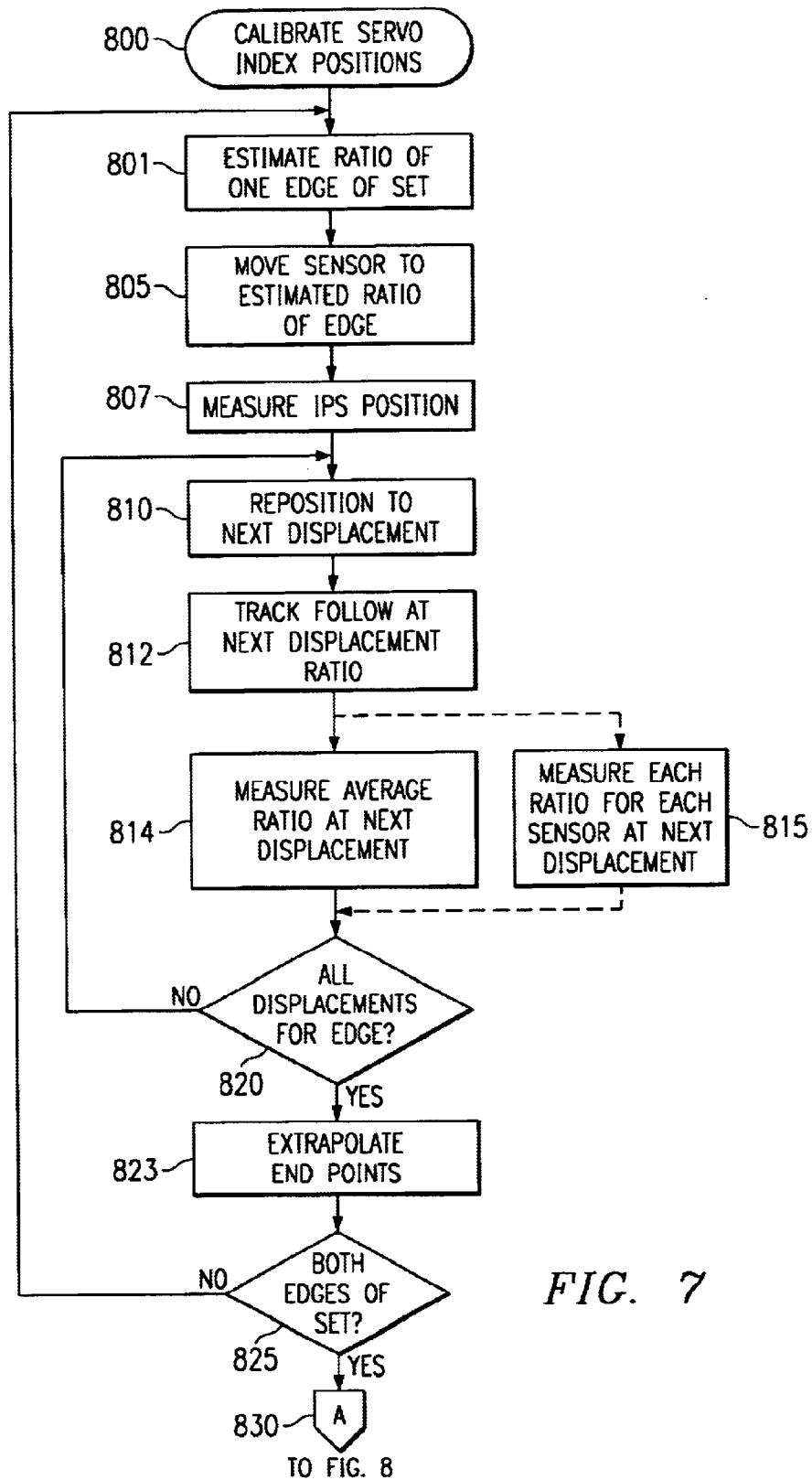
FIGS. 7 and 8 are flow charts depicting an embodiment of the present invention for curve fitting a two dimensional, second order curve to the ratios of the sensed servo signals with respect to predetermined displacements for the linear servo edges to calibrate expected position error signals for a servo loop at the laterally offset servo index positions with respect to the sensed servo edges.
Figure 8:
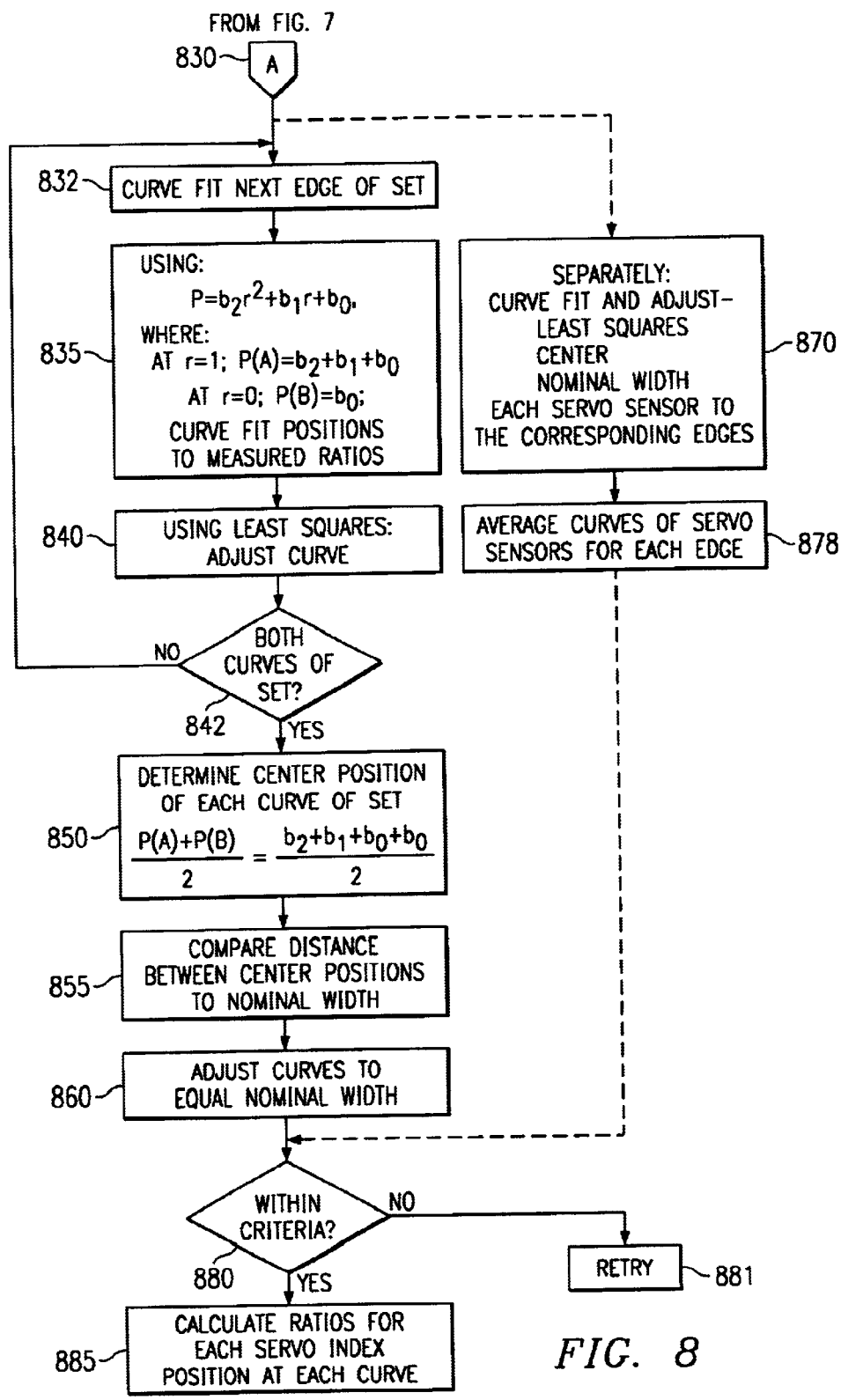

FIGS. 7 and 8 illustrate an embodiment of the method in accordance with the present invention for the calibration of servo index positions of a magnetic tape in a track following servo system for one set of servo sensors, e.g., servo sensors 520–522 of FIG. 2, with respect to the servo edges. The method is repeated for any additional sets of servo sensors with respect to the servo edges.

The method begins at step 800. Referring additionally to FIGS. 1 and 2, in step 801, the logic 465 estimates the ratio of one edge of the set of servo signals, e.g., the set of servo signals 525, or the average of the sets of servo signals 525–527 with respect to the servo sensors. This step may be conducted, for example, in accordance with the incorporated '159 patent, or as another example, in accordance with the incorporated 09/13,327 application.

Referring additionally to FIGS. 3, 5 and 6, in step 805, the logic 465 operates the servo loop 32, 28, 24 to laterally position the servo sensor or sensors 520–522, 530–532, or 540–542, to sense the servo signals at estimated ratios of the servo detector representing locations comprising the servo edge or edges 47 or 48 (FIG. 3) of at least a set of linear servo edges. Then, in step 807, the logic 465 operates the independent position sensor 460 to determine the lateral position of the tape head servo sensor with respect to the magnetic tape at the sensed servo edge locations. The servo edges are represented as points 447 or 448 in FIGS. 5 and 6, illustrating the lateral position 451, 453 (for edge 47), or lateral position 452, 454 (for edge 48), as provided by the independent position sensor, and the ratio of the estimated servo edge 47 or 48.

In step 810, logic 465 operates the servo loop 32, 28, 24 to laterally reposition the servo sensor or sensors 520–522, 530–532, or 540–542, to the next of a plurality of lateral positions of the tape head at predetermined displacements from the sensed servo edge, where the displacement is determined by the independent position sensor 460. As discussed above, the predetermined displacements are shown as displacements 601–608 for position 451 of edge 447 and displacements 611–618 for position 452 of edge 448 of FIG. 5, and as displacements 641–648 for position 453 of edge 447 and displacements 651–658 for position 454 of edge 448 of FIG. 6. Thus, as an example, if the sensed edge comprised edge 447 of FIG. 5, at position 451, the logic 465 may reposition the servo sensor by a predetermined displacement to position 601 as determined by the independent position sensor.

In step 812, the servo loop 32, 28, 24 locks to the linear servo edges at the ratio (PES) of the predetermined displacement, and track follows the linear servo edges at the predetermined displacement, and in step 814, or alternatively in step 815, the logic 465 determines from the servo detector 24, the ratio of the sensed servo signals at the track followed predetermined displacement. Step 814 comprises determining the average ratio of the servo sensors 520–522, 530–532, or 540–542, and step 815 comprises determining the ratio of only one of the sensors. Specifically, the ratio of the sensed servo signals is determined as the servo loop track follows at the PES representing each of the predetermined displacements, taken one at a time for the selected edge, and shown respectively as points 621–628 for edge 447 and points 631–638 for edge 448 of FIG. 5, and as points 661–668 for edge 447 and points 671–678 for edge 448 of FIG. 6. As an example, if the servo sensor has been repositioned–to predetermined displacement 601 in FIG. 5 as determined by the independent position sensor and track followed the ratio of point 621 is determined.

Step 820 determines whether the servo sensor or sensors have been repositioned at all of the predetermined displacements for the edge, and the ratios determined. Thus, as an example, step 820 determines whether, for edge 447 of FIG. 5, the ratios of the points 621–628 at displacements 601–608 for position 451 of edge 447 have been determined. If not, "NO", the process cycles back to step 810 to again operate the servo loop 32, 28, 24 to laterally reposition the servo sensor or sensors 520–522, 530–532, or 540–542, to the next of a plurality of lateral positions of the tape head at predetermined displacements from the sensed servo edge, where the displacement is determined by the independent position sensor 460, to, in step 812, track follow the linear servo edges at the predetermined displacement, and in step 814, or alternatively in step 815, to determine from the servo detector 24, the ratio of the sensed servo signals at the predetermined displacement. As an example, if the servo sensor was repositioned to only displacement 601 of FIG. 5, to determine the ratio of point 621, step 810 again operates the servo loop 32, 28, 24 to laterally reposition the servo sensor or sensors 520–522, 530–532, or 540–542, to the next of a plurality of lateral positions of the tape head, for example, at predetermined displacement 602 to determine the ratio of point 622.

If step 820 determines that all of the predetermined displacements for the edge have been made, and the ratios determined, the ratios have been determined for each of the displaced positions and for the edge position.

Because of tape noise, ratios of "0" and of "1" cannot be sensed and determined. Hence, in accordance with the present invention, the predetermined displacements that would theoretically be at the outer positions representing the ratios of "0" and of "1" are excepted from steps 810–815. Rather, in step 823, at the outer positions, the ratios are calculated by extrapolating from the ratios of the adjacent predetermined offsets toward the linear servo edge. Thus, as an example, for edge 447 of FIG. 5, the ratio of point 680 is extrapolated from points 623 and 624, and the ratio of point 681 is extrapolated from points 627 and 628. For edge 448 of FIG. 5, the ratio of point 682 is extrapolated from points 633 and 634, and the ratio of point 684 is extrapolated from points 637 and 638. For edge 447 of FIG. 6, the ratio of point 685 is extrapolated from points 663 and 664, and the ratio of point 686 is extrapolated from points 667 and 668. For edge 448 of FIG. 6, the ratio of point 687 is extrapolated from points 673 and 674, and the ratio of point 688 is extrapolated from points 677 and 678. In this manner, step 823 provides an assurance that the ends of the curve fit will be properly bounded.

In step 825, logic 465 determines whether all the ratios of the points of both edges of a set of edges have been determined, and if not, "NO", the process cycles back to step 801 to the other edge of the set of edges. If the ratios of both edges have been determined, "YES" in step 825, connector 830 leads to FIG. 8 to curve fit the next edge of a set of edges, as illustrated by step 832.

In step 835, a standard curve fit routine is employed to fit the determined ratios of the sensed servo signals with respect to the predetermined displacements to a two dimensional, second order curve for each linear servo edge of the set of edges. An example of a second order curve comprises a quadratic equation:

$$p = b_2 r^2 + b_1 r + b_0$$

where: p=position (e.g., measured in microns by the independent position sensor);
r=determined ratio.

At the extrapolated end points where the ratios are theoretically "0" and "1", the curve becomes:

At r=1; $P_{(A)} = b_2 + b_1 + b_0$;
At r=0; $P_{(B)} = b_0$.

Thus, in FIG. 5, step 835 curve fits curve 691 to points 621–628 and 447 for edge 447, and curve fits curve 692 to points 631–638 and 448 for edge 448 of FIG. 5. In FIG. 6, step 835 curve fits curve 693 to points 661–668 and 447 to edge 447, and curve fits curve 694 to points 671–678 and 448 to edge 448 of FIG 6.

As illustrated by point 625 in FIG. 5 and point 676 in FIG. 6, the magnetic characteristics of the servo recording head or of the servo sensor, or both, may result in determined ratios that are offset from the fitted curve, as shown respectively by lines 837 and 838, respectively. Step 840 comprises a least squares adjustment, employing a standard algorithm, of the quadratic equation second order curve to the determined ratios at the predetermined displacements, smoothing the curve and eliminating a likely error. Additionally, the adjustment may have predetermined limits, such that a point whose determined ratio is outside the predetermined limits will be ignored and the curve refitted to the remaining determined ratios.

Step 842 determines whether both or only one of the edges of the set of linear servo edges has been curve fitted. If not, the process cycles back to step 832 to curve fit the other edge of the set of linear servo edges. Thus, if a curve 691 has been fitted to the points 621–628 and 447 for edge 447 of FIG. 5, the process cycles back to step 832 to curve fit curve 692 to points 631–638 and 448 for edge 448.

As the result of the curve fitting, the estimated locations of the servo edges may be found to be incorrect. In accordance with the present invention, two steps are taken to adjust the curves to the correct locations of the servo edges.

In step 850, the position of the center of each curve is calculated from the end points of the curve. Referring additionally to FIG. 4, the end points are the points $P_{(A)}$ and $P_{(B)}$ at which the ratios are "1" and "0", respectively. The calculation comprises determining the positions of each of the end points on the curve, and dividing by two. The calculation may comprise calculating:

$$(b_2 + b_1 + b_0 + b_0)/2.$$

Referring to FIG. 6, as an example, the calculation of step 850 for curve 694 may indicate that the center position of the curve is at position 852 along the curve rather than at the estimated position of the edge 448.

Then, in step 856 of FIG. 8, and referring additionally to FIGS. 1, 3, 5 and 6, the logic 465 determines the lateral distance between lateral positions of the tape head at the curve fitted ratios which indicate each of the linear servo edges of the set; and, in step 860, adjusts the curve fitted ratios to cause the determined lateral distance to equal the nominal or theoretical ideal separation distance 490 of FIG. 3. Specifically, in step 856, the distance between the determined center positions of the servo edges of a set of servo edges (e.g., distance 857 in FIG. 5, or distance 858 of FIG. 6) is compared to the nominal width of the middle servo signal 490 of FIG 3. Step 860 then adjusts the lateral position of the curve so that the distance between the determined center positions (e.g., positions of points 447 and 448 of FIG. 5, or positions of points 447 and 852 of FIG. 6) equals the nominal width 490.

Figure 9:
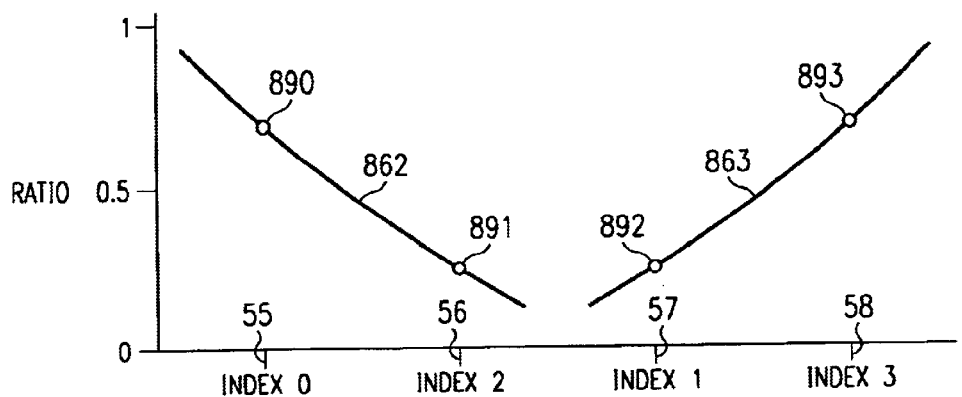
FIG. 9 is a diagrammatic representation of the calibrated servo index positions along the curve fitted ratio between the sensed servo signals of each of two parallel linear edges in accordance with an embodiment of the present invention, where the center recorded servo signal generating the edges is of a relatively strong amplitude.
Figure 10:
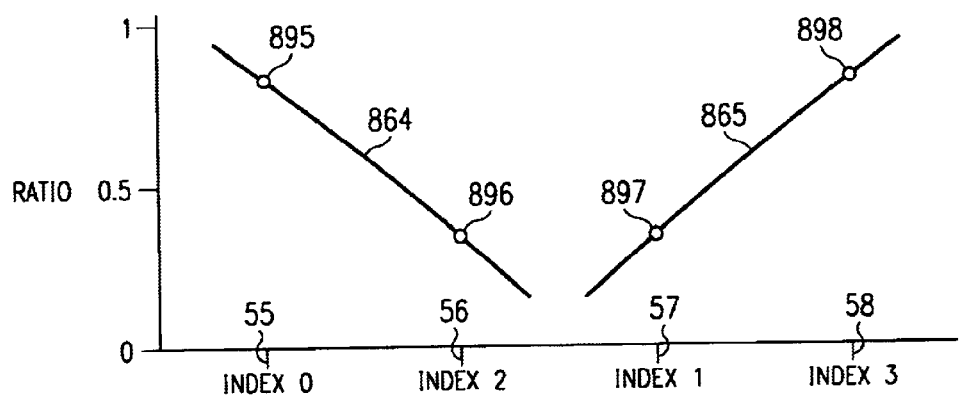
FIG. 10 is a diagrammatic representation of the calibrated servo index positions along the curve fitted ratio between the sensed servo signals of each of two parallel linear edges in accordance with an embodiment of the present invention, where the center recorded servo signal generating the edges is of a relatively weak amplitude.

FIGS. 9 and 10 illustrate examples of curve fitted and adjusted curves that originated as the ratio and position measurements of FIGS. 5 and 6, respectively. In FIGS. 9 and 10 the curves represent the ratios between the sensed servo signals of each of two parallel linear servo edges of a set of servo edges, at various lateral positions of the servo sensors. In accordance with the present invention, the ratios of the curves provide a means to calibrate expected position error signals for the servo loop at the laterally offset servo index positions with respect to the sensed servo edges of the set of linear servo edges. Thus, in FIG. 9, even though the center recorded servo signal generating the edges is of a relatively strong amplitude, the present invention provides curves 862 and 863 to calibrate the positioning of the servo index positions. In FIG. 10, even though the center recorded servo signal generating the edges is of a relatively weak amplitude, the present invention provides curves 864 and 865 to calibrate the positioning of the servo index positions.

In the example of FIG. 8, the average ratios of the servo sensors 520–522,–530–532, or 540–542, have been employed for steps 832–860, based on the determinations of step 814 of FIG. 7.

Thus, upon completion of the curve fitting, fitted curves are stored in database 405 of FIG. 1 for the average of servo sensors 520–522, for the average of servo sensors 530–532, and for the average of servo sensors 540–542, each with respect to the sets of servo edges 525–527.

As an alternative, in step 870, a separate curve may be fitted for each servo sensor for the corresponding sets of servo edges, and the adjustments for least squares, center position, and nominal width are made, employing steps 832–860 for each servo sensor separately, based on the determinations of step 815 of FIG. 7. As discussed above, and referring additionally to FIG. 2, this alternative will allow measurements to be made even should one of the sets of servo signals be subject to a dropout during the measurements. Thus, upon completion of the curve fitting, fitted curves are stored in database 405 of FIG. 1 for each of the servo sensors 520–522, for each of the servo sensors 530–532, and for each of the servo sensors 540–542, each with respect to the corresponding set of servo edges 525–527. The servo loop 32, 28, 24 laterally positions the tape head based on the average of the sensed servo signals. Thus, in step 878, the separate curves are averaged for each set of servo sensors for the corresponding servo edges. As an example, the fitted and adjusted curves for sensors 520, 530 and 540 are averaged together, and stored in database 405 of FIG. 1.

At any point in the process, it may become clear that no correct calibration may be made, perhaps due to damage to the magnetic tape. Step 880 comprises the determination whether the curves are being fitted correctly within a predetermined criteria. Step 880 may be provided at any point in the process of FIGS. 7 and 8, and may be provided repeatedly throughout the process. Thus, if the curves do not meet the predetermined criteria, step 880 leads to a retry process of step 881. The retry process repeats the above process at least once at a different longitudinal position of the magnetic tape, and, upon further failure, will signal an error in the calibration process.

If the curves are within the criteria, in step 885, the ratios representing the position error signals for the servo loop at the laterally offset servo index positions are calculated. Additionally referring to FIGS. 3 and 9, as an example, step 885 calibrates the servo index positions 55, 56, 57 and 58 along curves 862 and 863 at position error signals represented by ratios 890, 891, 892 and 893, respectively. Referring additionally to FIGS. 3 and 10, step 885 calibrates the servo index positions 55, 56, 57 and 58 along curves 864 and 865 at position error signals represented by ratios 895, 896, 897 and 898, respectively.

Therefore, the present invention provides calibration of the servo index positions which are laterally offset from the servo edges comprising interfaces between two dissimilar recorded servo signals.

FIGS. 11, 12, 13A and 13B illustrate an embodiment of a servo, detector 28 in accordance with the incorporated 09/413,327 application. Briefly, referring to FIG. 11, the analog servo signals are sensed at the servo element of the tape head 20, and the servo detector 28 converts the analog servo signals to a synchronous digital samples of the signal in analog front end 65, and a digital servo track decoder 66 decodes the digital samples and determines the amplitudes of the envelopes of the minimum and the maximum signals represented by the digital samples.

Figure 11:
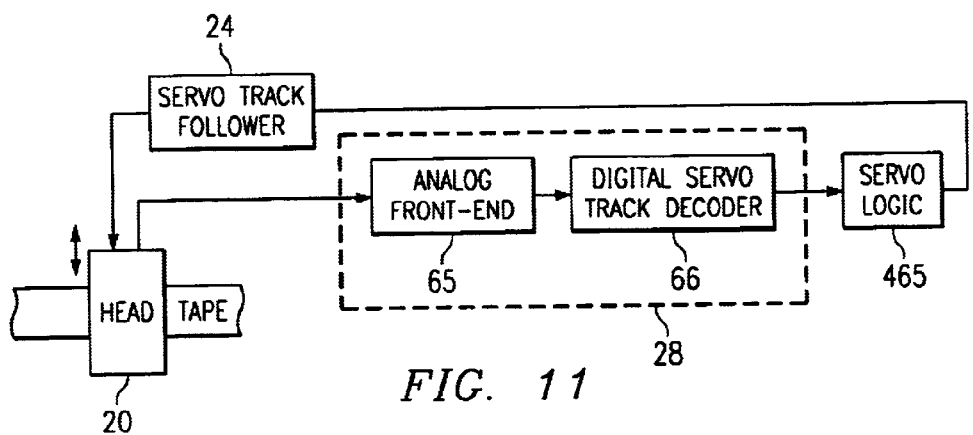
FIGS. 11 and 12 are block diagrams of a servo detector for detecting the dissimilar servo signals of the servo edges of FIG. 2.
Figure 12:
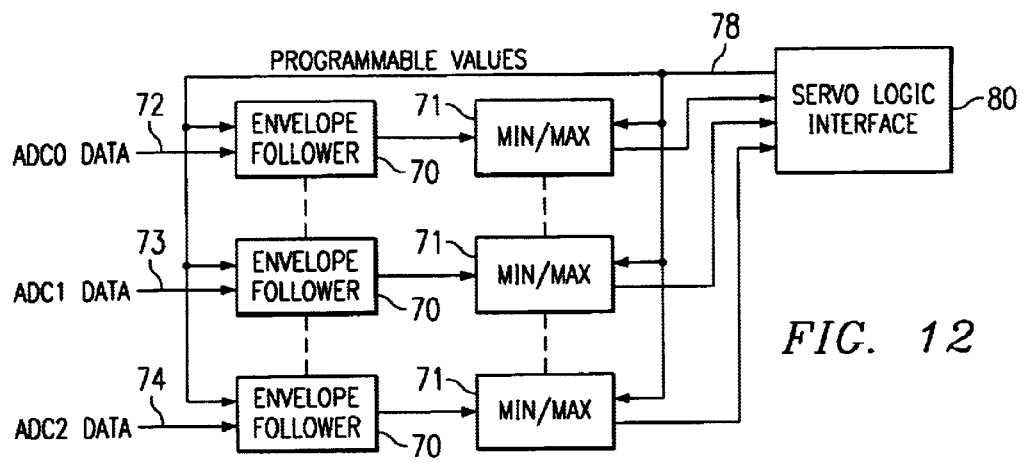

FIG. 12 illustrates a plurality of the digital servo track decoders of FIG. 11, each comprising an envelope follower 70 and a minimum/maximum detector 71. Each of the envelope followers 70 receives the a synchronous digital samples of a different servo element from an associated analog front end on a respective line 72–74. The minimum/maximum detectors determine the relative amplitudes of the sensed servo signals and provide the relative amplitudes to the servo logic 465 at an interface 80 for determining the ratios.

Figure 13A:
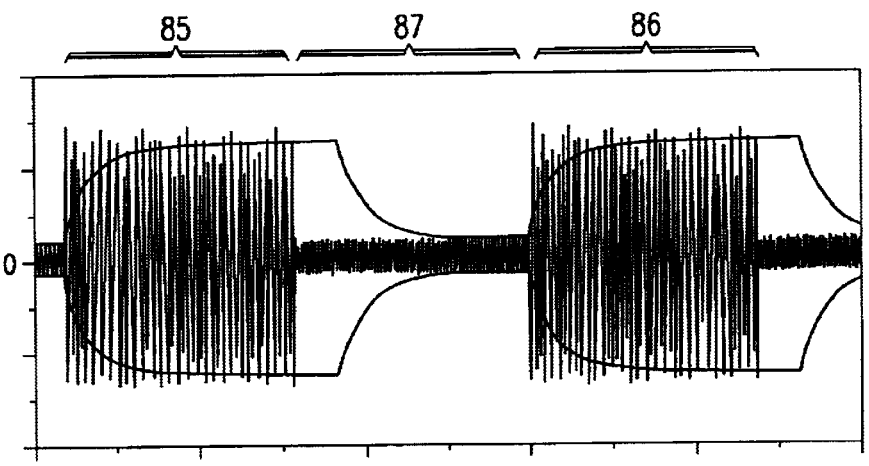
FIGS. 13A and 13B are illustrations of exemplary analog servo signals for different positions of a servo sensor with respect to a servo edge of FIG. 2 and examples of the digital envelopes of the respective analog servo signals generated by the servo detector of FIGS. 11 and 12.
Figure 13B:
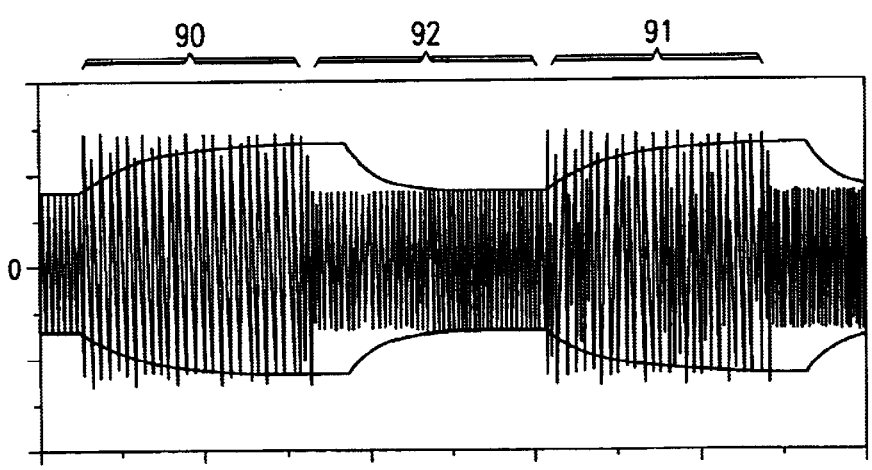

FIGS. 13A and 13B illustrate wave forms of the analog signal from the servo transducer at, respectively, positions 506 and 508 of FIG. 3. Thus, in FIG. 10A, the bursts 85 and 86 formed while the servo transducer is at position 506 of FIG. 3, from the combination of the first frequency and the second frequency burst is at a high amplitude, but the burst 87 formed from the combination of the first frequency and the null signal is at a very low amplitude because only a small portion of the servo transducer is positioned over the first frequency. In FIG. 13B, the bursts 90 and 91 formed while the servo transducer is at position 508 of FIG. 3 from the combination of the first frequency and the second frequency burst is at a high amplitude, as is the burst 92 formed from the combination of the first frequency and the null signal, because the servo transducer is positioned primarily over the first frequency. The incorporated 09/413,327 application digitally distinguishes the bursts and then provides the amplitudes of the envelopes of the respective bursts so that the ratio may be determined.

Figure 14:
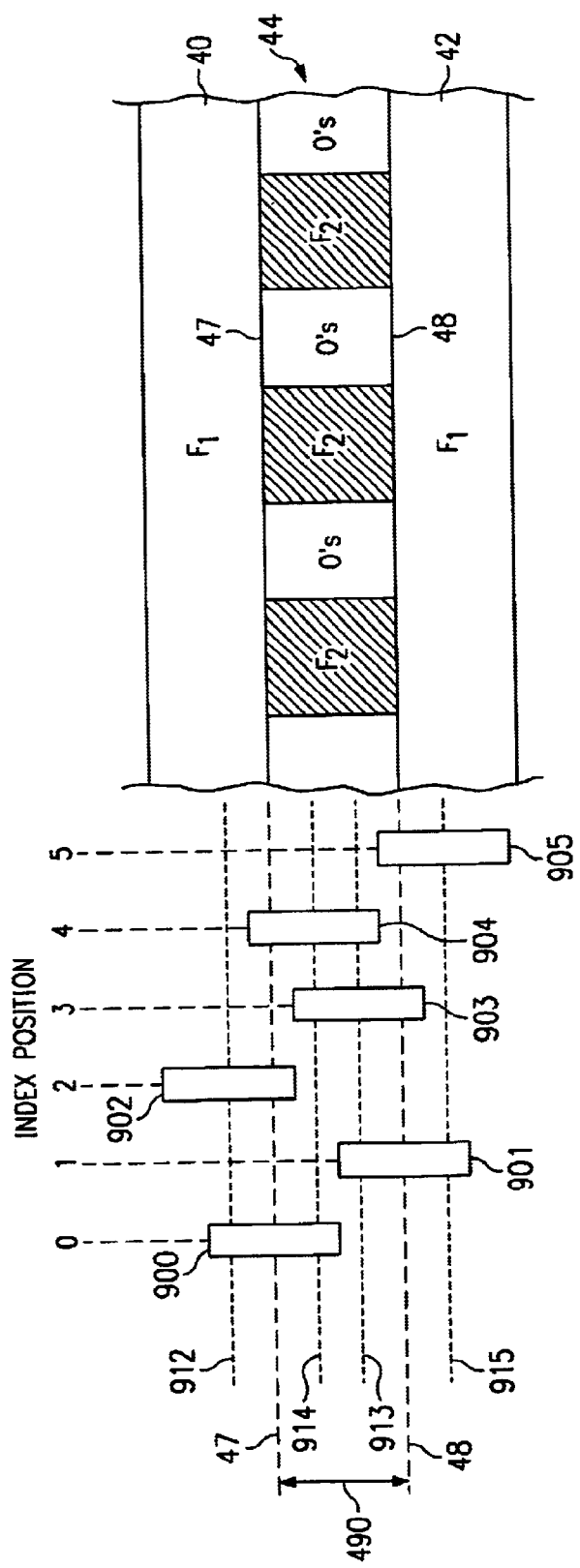
FIG. 14 is a detailed diagrammatic representation of a magnetic tape format providing six servo index positions in one set of two linear servo edges of the magnetic tape of FIG. 2.

FIG. 14 illustrates another embodiment of displaced index positions that may be employed with the present invention. At the "0" or "1" index positions, the servo element is located at position 900 centered on servo edge 47 or at position 901 centered on servo edge 48. Additional index positions are provided which are aligned such that a servo element is displaced from an edge 47 or 48 located along lines 912–915 about ⅓ the width of the middle track 44 away from the servo edge 47 or 48 in either direction. As the result, the number of index positions becomes six. In order to center the data read/write elements in the "2" and "5" index positions, the servo read element must be located at position 902 or at position 905, and will read a minimum signal that has an amplitude ratio of about ⅚ of the maximum signal, and to center the data read/write elements in the "3" and "4" index positions, the servo read element must be located at position 903 or at position 904, and will read a minimum signal that has an amplitude ratio of about ⅙ of the maximum signal. Thus, referring additionally to FIGS. 9 and 10, the servo logic 465 will calibrate different sets of position error signals representing different ratios along curves 862 and 863, or along curves 864 and 865 for determining the displacements of the servo index positions, including the on edge positions 900 and 901 for the servo edges.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for calibrating servo index positions of a magnetic tape in a track following servo system, said magnetic tape having a plurality of parallel sets of linear servo edges, each said servo edge comprising an interface between two dissimilar recorded servo signals, each said set of servo edges comprising one of said servo edges on each of opposite lateral sides of a middle said recorded servo signal, at least a plurality of said servo index positions laterally offset from said linear servo edges, said track following servo system comprising at least one servo sensor of a tape head for sensing said recorded servo signals of said tape, a servo loop for positioning said tape head laterally with respect to said magnetic tape to track follow said sensed servo signals at specific position error signals representing displacements from said linear servo edges as determined from ratios of said sensed servo signals, and an independent position sensor to sense lateral position of said magnetic tape with respect to said tape head servo sensor, said method comprising:

laterally positioning said at least one servo sensor to sense said servo signals at estimated ratios of said servo detector representing locations comprising said servo edges of at least a set of linear servo edges;

determining independent position sensor lateral position of said tape head servo sensor with respect to said magnetic tape at said sensed servo edge locations;

laterally repositioning said tape head servo sensor to a plurality of lateral positions of said tape head at predetermined displacements from said sensed servo edges as determined by said independent position sensor;

track following said linear servo edges with said servo loop at each of said predetermined displacements;

determining said ratio of said sensed servo signals at each of said predetermined displacements; and curve fitting a two dimensional, second order curve to said ratios of said sensed servo signals with respect to said predetermined displacements for each said linear servo edge to calibrate expected said position error signals for said servo loop at said laterally offset servo index positions with respect to said sensed servo edges of said set of linear servo edges.

2. The method for calibrating servo index positions of claim 1, wherein said linear servo edges of each said set have a theoretical ideal separation distance, and wherein said method additionally comprises the steps of:

determining lateral distance between lateral positions of said tape head at said curve fitted ratios which indicate each of said linear servo edges of said set; and adjusting said curve fitted ratios to cause said determined lateral distance to equal said theoretical ideal separation distance.

3. The method for calibrating servo index positions of claim 1, wherein said two dimensional, second order curve fitting step comprises the steps of:

determining, from said determined ratios at said predetermined displacements, a quadratic equation second order curve representing said lateral positions of said tape head with respect to each said servo edge of said set;

least squares adjustment of said quadratic equation second order curve to said determined ratios at said predetermined displacements; and calculation of each said expected position error signal with respect to said sensed servo edges of said set of linear servo edges at each of said servo index positions along said determined and adjusted two dimensional, second order curve.

4. The method for calibrating servo index positions of claim 1, wherein said plurality of linear servo edges comprise a plurality of sets of linear servo edges, and said tape head comprises a plurality of said servo sensors for sensing said plurality of sets of linear servo edges, said method comprising:

said lateral positioning and servo edge sensing step additionally comprises separately sensing each of said servo edges of each said plurality of sets of linear servo edges;

said ratio determining step additionally comprises averaging said ratio of said sensed servo signals of each said sensed set of linear servo edges at each of said predetermined displacements to determine said ratio; and said two dimensional, second order curve fitting step comprises curve fitting said averaged ratios of said sensed servo signals for each said linear servo edge of said sets to calibrate expected said position error signals for said servo loop at said servo index positions with respect to said sensed servo edges of said sets of linear servo edges.

5. The method for calibrating servo index positions of claim 4, wherein said magnetic tape comprises three said plurality of parallel sets of linear servo edges and said servo sensors of said tape head simultaneously sense said recorded servo signals of said tape at each of said three parallel sets of linear servo edges; and wherein said two dimensional, second order curve fitting step of said method comprises separately curve fitting said ratios of each said linear servo edge of all three said sets of linear servo edges, and averaging said separately curve fitted ratios to calibrate said expected position error signals.

6. The method for calibrating servo index positions of claim 1, wherein said ratios of said ratio determining step theoretically include ratios of said sensed servo signals of "1" and of "0" at outer said predetermined displacements from said linear servo edges; wherein said method additionally comprises excepting said outer predetermined displacements from said laterally repositioning and track following steps; and said ratio determining step additionally comprises calculating said ratios of each said outer predetermined displacements, extrapolating from said ratios of adjacent predetermined offsets toward said linear servo edge.

7. The method for calibrating servo index positions of claim 1, wherein said tape head comprises a plurality of laterally offset servo sensors for sensing said recorded servo signals of said tape, and wherein, in said method, said lateral positioning and servo edge sensing step, said independent position sensor lateral position determining step, said lateral repositioning step, said track following step, and said ratio determining steps are repeated for each of said plurality of servo sensors with respect to said sensed servo signals at at least one set of said plurality of linear servo edges; and wherein said two dimensional, second order curve fitting step comprises separately curve fitting said ratios of each said servo sensor for said at least one set of linear servo edges to separately calibrate said expected position error signals for each of said servo sensors with respect to said at least one set of linear servo edges.

8. A servo system for calibrating servo index positions of a magnetic tape for track following, said magnetic tape having a plurality of parallel sets of linear servo edges, each said servo edge comprising an interface between two dissimilar recorded servo signals, each said set of servo edges comprising one of said servo edges on each of opposite lateral sides of a middle said recorded servo signal, at least a plurality of said servo index positions laterally offset from said linear servo edges, said servo system comprising:

at least one servo sensor of a tape head, said tape head movable laterally of said magnetic tape, said at least one servo sensor sensing said servo signals comprising said servo edges of at least one said set of linear servo edges;

an independent position sensor for determining the mechanical lateral position of said tape head servo sensor with respect to said magnetic tape;

a servo detector coupled to said at least one servo sensor for determining a ratio of said servo signals sensed by said servo sensor;

a servo loop coupled to said servo detector for positioning said tape head laterally of said magnetic tape to track follow said sensed servo signals at specific position error signals representing offsets from said linear servo edges in accordance with said ratios of said sensed servo signals as determined by said servo detector; and logic coupled to said servo detector, said independent position sensor, and said servo loop; said logic:

operating said servo loop to laterally position said at least one servo sensor to sense said servo signals at estimated ratios of said servo detector representing locations comprising said servo edges of at least a set of linear servo edges;

determining from said independent position sensor, the lateral position of said tape head servo sensor with respect to said magnetic tape at said sensed servo edges;

operating said servo loop to laterally reposition said tape head servo sensor to a plurality of lateral positions of said tape head at predetermined displacements from said sensed servo edges as determined by said independent position sensor; and to track follow said linear servo edges with said servo loop at each of said predetermined displacements;

determining from said servo detector, said ratio of said sensed servo signals at each of said predetermined displacements; and curve fitting a two dimensional, second order curve to said ratios of said sensed servo signals with respect to said predetermined displacements for each said linear servo edge to calibrate expected said position error signals for said servo loop at said laterally offset servo index positions with respect to said sensed servo edges of said set of linear servo edges.

9. The servo system for calibrating servo index positions of claim 8, wherein said linear servo edges of each said set have a theoretical ideal separation distance, and wherein said logic additionally:

determines lateral distance between lateral positions of said tape head at said curve fitted ratios which indicate each of said linear servo edges of said set; and adjusts said curve fitted ratios to cause said determined later al distance to equal said theoretical ideal separation distance.

10. The servo system for calibrating servo index positions of claim 8, wherein said logic, in curve fitting said two dimensional, second order curve:

determines, from said determined ratios at said predetermined displacements, a quadratic equation second order curve representing said lateral positions of said tape head with respect to each said servo edge of said set;

least squares adjusts said quadratic equation second order curve to said determined ratios at said predetermined displacements; and calculates each said expected position error signal with respect to said sensed servo edges of said set of linear servo edges at each of said servo index positions along said determined and adjusted two dimensional, second order curve.

11. The servo system for calibrating servo index positions of claim 8, wherein said plurality of linear servo edges comprise a plurality of sets of linear servo edges, and said tape head comprises a plurality of said servo sensors for sensing said plurality of sets of linear servo edges, said logic:

in conducting said lateral positioning and servo edge sensing, additionally separately senses each said servo edge of each of said plurality of sets of linear servo edges;

in determining said ratios, additionally averages said ratio of said sensed servo signals of each said sensed set of linear servo edges at each of said predetermined displacements to determine said ratio; and in curve fitting said two dimensional, second order curve, curve fits said averaged ratios of said sensed servo signals for each said linear servo edge of said sets to calibrate expected said position error signals for said servo loop at said laterally offset servo index positions with respect to said sensed servo edges of said sets of linear servo edges.

12. The servo system for calibrating servo index positions of claim 11, wherein said magnetic tape comprises three said plurality of parallel sets of linear servo edges and said servo sensors of said tape head simultaneously sense said recorded servo signals of said tape at each of said three parallel sets of linear servo edges; and wherein said logic, in curve fitting said two dimensional, second order curve, separately curve fits said ratios of each said linear servo edge of all three said sets of linear servo edges, and averages said separately curve fitted ratios to calibrate said expected position error signals.

13. The servo system for calibrating servo index positions of claim 8, wherein said ratios of said ratio determining step. theoretically include ratios of said sensed servo signals of "1" and of "0" at outer said predetermined displacements from said linear servo edges; wherein said logic additionally excepts said outer predetermined displacements from said laterally repositioning and track following; and in said ratio determining, additionally calculates said ratios of each said outer predetermined displacements extrapolating from said ratios of adjacent predetermined displacements toward said linear servo edge.

14. The servo system for calibrating servo index positions of claim 8, wherein said tape head comprises a plurality of laterally offset servo sensors for sensing said recorded servo signals of said tape, and wherein said logic, repeats said lateral positioning and servo edge sensing, said independent position sensor lateral position determining, said lateral repositioning, said track following, and said ratio determining, for leach of said plurality of servo sensors with respect to said sensed servo signals at at least one set of said plurality of linear servo edges; and, in curve fitting said two dimensional, second order curve, separately curve fits said ratios of each said servo sensor for said at least one set of linear servo edges to separately calibrate said expected position error signals for each of said servo sensors with respect to said at least one set of linear servo edges.

* * * * *